P. H. & F. M. Roots.
Rotary Blower Case.

No. 3,570. Reissued Jul. 27, 1869.

Witnesses.
Alex H. Roberts
Wm A. Morgan

Inventor
P. H. Roots
F. M. Roots
per Munn & Co
Attorneys

UNITED STATES PATENT OFFICE.

P. H. ROOTS AND F. M. ROOTS, OF CONNERSVILLE, INDIANA.

IMPROVEMENT IN CASES FOR ROTARY BLOWERS.

Specification forming part of Letters Patent No. 81,010, dated August 11, 1868; Reissue No. 3,570, dated July 27, 1869.

*To all whom it may concern:*

Be it known that we, P. H. ROOTS and F. M. ROOTS, of Connersville, in the county of Fayette and State of Indiana, have invented certain new and useful Improvements in Cases or Shells for Rotary Blowers; and we do hereby declare that the following is a full, clear, and exact description of the construction and operation of the same, reference being had to the annexed drawings, making part of this specification, in which—

Figure 1:
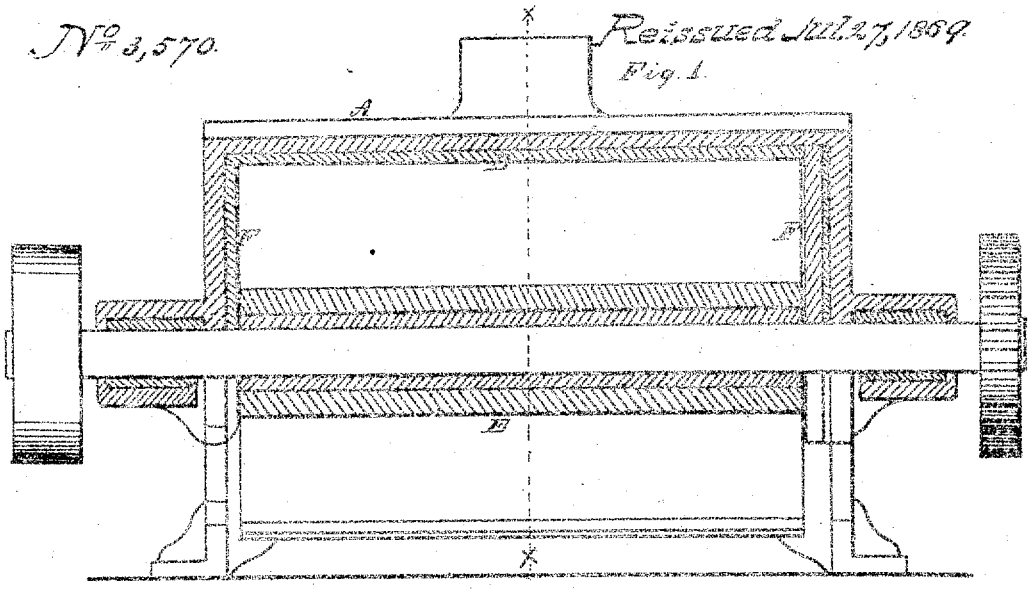
Figure 2:
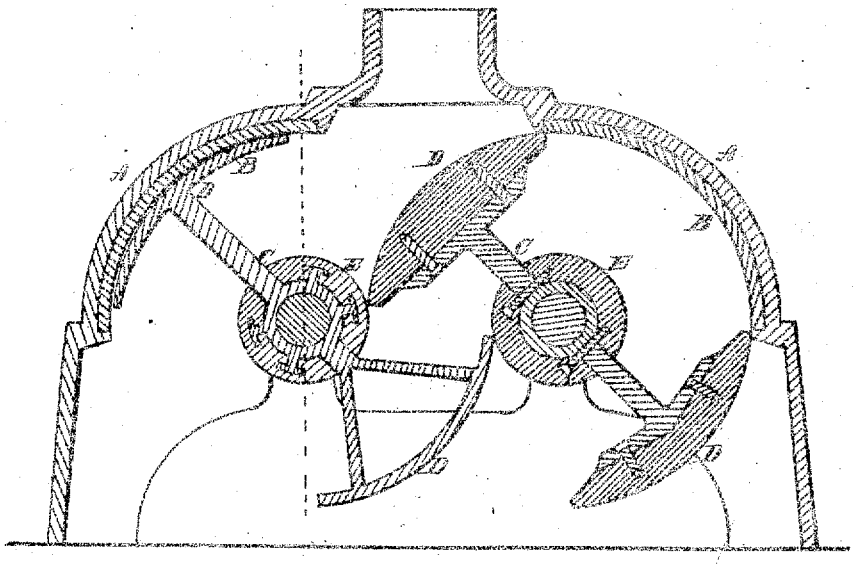

Figure 1 represents a longitudinal vertical section of the blower through the line *x x* of Fig. 2. Fig. 2 is a vertical cross-section of Fig. 1 through the line *y y*.

Similar letters of reference indicate corresponding parts.

The objects of this invention are, first, to avoid the necessity of boring out the interior concave surfaces of the shell or case; secondly, to obviate the necessity of facing off or planing the end or head plates of the case; and, thirdly, to enable us to cast the outside casing in a single piece, none of which were accomplished before the date of our invention. We thus obtain a case of greater strength, with less material, and at the same time, by our method of fitting up, hereinafter more fully described, we obtain a case of greater accuracy than those fitted up in the ordinary manner, and at a great saving of labor and expense.

Our invention or means of obtaining the foregoing results are, first, in fitting up and rendering the interior of the case (both the concave arcs and the ends of the case) true, so as to accurately fit the rotating abutments, by the use of plaster-of-paris or other similar substances, which may be applied and fitted to the surfaces while in a plastic or liquid condition, but which afterward hardens or sets by evaporation or fixation of its water—that is, ceases to be plastic; secondly, in the use of secondary or inside heads, against which the ends of the pistons work; thirdly, in making the arcs B, with which the pistons D D come in contact, of less than half a circle; and, fourthly, in the use of the projecting guards *x x*, at the terminations of the concave arcs B B, both to hold and protect the lining of plaster.

A is the case or shell, with two accurately-described arcs, B B, each of less than half a circle, which corresponds with the circumference of the abutment-pistons. C C represent the revolving abutments. D D are the pistons. E E represent the inner abutment's cylinders. F′ represents the inside heads or plates used in making the ends of the blower-case true. F represents the end of the case, rendered true with a facing of plaster-of-paris alone.

We use two methods of making the inner surface of the blower-head true, which are respectively shown in the different ends of Fig. 1, at F and F′.

Our first method is to form them into planes at right angles to the shaft of the abutments, perfectly parallel with each other, and equally distant in all their parts, by giving the inner surface of the end plates a coating of plaster-of-paris, hydraulic cement, or other material having the properties above referred to. This method is well adapted to the blowers of a smaller size. When this method is used the plaster-of-paris may be put on, while in a plastic condition, with a sweep attached to a shaft made to turn in the boxes of the blower-shafts, so that it will shape the linings of the ends of the case in a plane at right angles with the shaft.

Our second method is to use secondary or inside metal plates, made in their general outlines to conform to the shape of the interior of the case, and the inner sides of which are faced or planed off so as to be perfectly true.

In this method the trued or inner surfaces of the plates are parallel with each other and precisely at right angles in all directions with the shafts, leaving a space between these secondary plates and the ends of the case, which is filled with plaster-of-paris of the proper consistency. After the plaster has set, the secondary plates are securely fastened in their places in any suitable manner.

Having described the method of making the ends of the case true, we will now describe our method of making the circular part of the case true, so as to fit the pistons or working parts of the blower.

In making the arcs heretofore alluded to true, we usually work from the center of our shaft-journals as fixed points. We give the inner part of the concave a coating of plaster-of-paris, and work it into the proper shape and form while it is setting by the use

BEST AVAILABLE COPY of a sweep attached to a shaft lying in the journal-boxes of the blower. While the plaster or other similar material is becoming set, we slowly move the sweep, so as to accurately form it to the required shape.

Instead of using the sweep we sometimes use a cylinder, of a diameter corresponding with the sweep or circle to be described by the pistons, which cylinder is hung on a central shaft resting in the aforesaid boxes, and then pour the plaster into the intervening space between the cylinder and the case and the metal guards *x x*. When the plaster has set the cylinder is removed, leaving an arc of the required circle.

Before the date of our invention the cylindrical parts of cases coming in contact with revolving pistons for the purposes analogous to ours consisted of at least half-circles. From this fact serious inconvenience followed, in this, that blowers having the concave parts of their cases consisting of half-circles cannot be made with a case cast in one piece.

This inconvenience has been remedied in our blowers by making the operative concave parts of the case of less than half a circle. And we have further found that, by our particular arrangement of the operative parts of our blower, fully shown in the drawings hereto attached, but more fully described in Letters Patent issued to us for improvement in rotary blowers of even date with the original Letters Patent of which this is a reissue, there is not only no sacrifice of the value or correct operation of the machine by the described reduction of the operative concave parts of our case, but that there is economy of labor and material in thus making it, and when so made it is much more simple, substantial, and less liable to get out of repair.

We are thus enabled to construct a case for rotary blowers which can be made in one piece, and which possesses superior advantages of strength and lightness, and effects a great saving in labor and material.

For our very large blowers we do not cast the case in a single piece; but all the smaller ones, including the sizes ordinarily used by blacksmiths, and medium-sized foundry-blowers, are cast in a single piece.

It is manifestly necessary, provided the case of a rotary blower be cast in one entire piece, that the concave arcs B B′ should be of such dimensions, and placed sufficiently on one side of the plane of the axis of the shafts as to allow the removal of sufficient portions of the end or head plates I I of the case in the opposite plane, and afford sufficient opening for the introduction or removal of the abutments without interfering with any parts of the case otherwise than to remove or replace the boxing which holds the shafts. By making the dimensions of the concave arcs B B′ a little more than a quarter-circle, and placing them chiefly on one side of the plane of the shafts, the opening on the opposite side of the plane is correspondingly increased, allowing ample room for putting in and taking out the abutments, and also allowing the reduction or shortening of the end plates I I on the open side of the plane, which would otherwise interfere; whereas, if the concave arcs B B′ were very materially increased, and divided nearly equally on the two sides of the plane of the shafts, the abutments of a case so made could not be taken out or replaced without taking the case apart, which would need to be made accordingly.

The great advantages of our method of forming these cases will be understood when the mechanical difficulties of facing off the ends and accurately boring out or truing the concave of a metallic case in the ordinary manner are considered.

We thus produce a blower more accurate and effective in its operation, and at a greatly reduced cost to the purchaser, thus greatly extending the use of this most effective machine by placing it within the reach of blacksmiths and others engaged in similar pursuits.

Having thus described our invention, what we claim as new, and desire to secure by Letters Patent, is—

1. A rotary blower-case the interior of which is rendered true and accurate by means of plaster-of-paris or its described equivalent, applied substantially as shown and described.

2. A rotary blower-case the ends or heads of which are rendered true and accurate by means of plaster-of-paris or its described equivalent, applied substantially as described.

3. The piston B, in combination with the center cylinder O, both being constructed on suitable shafts entirely of sheet metal, substantially as and for the purposes set forth.

4. A rotary hand-blower, in combination with the described arrangement of pulleys and belts or cog-gearing for multiplying the speed, substantially as and for the purpose set forth.

5. A rotary blower-case the ends or heads of which are made true and accurate by the use of secondary or inside metal plates F′, substantially as and for the purpose described.

6. The guards *x x*, in combination with concaves B B, lined or finished interiorly, substantially as described.

P. H. ROOTS.
F. M. ROOTS.

Witnesses:
GEO. E. JONES,
WM. W. SCARLETT.